US012222083B2

(12) United States Patent
Huang et al.

(10) Patent No.: US 12,222,083 B2
(45) Date of Patent: Feb. 11, 2025

(54) SWITCHING DEVICE AND LED CANDLE LIGHT

(71) Applicant: Xiamen Global Selection Imp & Exp Co Ltd, Xiamen (CN)

(72) Inventors: Kaiqin Huang, Xiamen (CN); Liangliang Li, Xiamen (CN)

(73) Assignee: XIAMEN GLOBALSELECTION IMP & EXP CO LTD, Xiamen (CN)

( * ) Notice: Subject to any disclaimer, the term of this patent is extended or adjusted under 35 U.S.C. 154(b) by 0 days.

(21) Appl. No.: 18/511,615

(22) Filed: Nov. 16, 2023

(65) Prior Publication Data

US 2024/0159366 A1 May 16, 2024

(30) Foreign Application Priority Data

Nov. 16, 2022 (CN) ......................... 202223047344.7
Aug. 1, 2023 (CN) ......................... 202322041773.1

(51) Int. Cl.

*F21S 6/00* (2006.01)
*F21S 9/02* (2006.01)
*F21V 23/04* (2006.01)
*F21Y 115/10* (2016.01)

(52) U.S. Cl.

CPC ................. *F21S 6/001* (2013.01); *F21S 9/02* (2013.01); *F21V 23/04* (2013.01); *F21Y 2115/10* (2016.08)

(58) Field of Classification Search

CPC .......... F21S 6/001; F21S 10/04; F21S 10/043; F21S 9/02; F21W 2121/00

See application file for complete search history.

(56) References Cited

U.S. PATENT DOCUMENTS 8,282,251 B2 * 10/2012 Fournier ............... F21S 10/043
362/249.05

* cited by examiner

*Primary Examiner* — William J Carter
(74) *Attorney, Agent, or Firm* — Calfee, Halter & Griswold LLP

(57) ABSTRACT

The present disclosure proposes a switch device and an LED candle lamp, including a battery compartment, and a lamp bead and a switch, the battery compartment is equipped with a hollow barrel assembly to accommodate a battery, the lamp bead is set on the lamp holder of the hollow barrel assembly, the switch is provided on the battery compartment by a hook&hole assembly, the lamp bead is connected to control the on-off of the lamp circuit by the switch and the battery, the switch is installed on the battery compartment through several positioning columns set on the battery compartment.

11 Claims, 7 Drawing Sheets

SWITCHING DEVICE AND LED CANDLE LIGHT

CROSS REFERENCE OF RELATED APPLICATION

The application claims the priority of the Chinese Patent Application No. 2023220417731 filed on Aug. 1, 2023 and the Chinese Patent Application No. 2022230473447 filed on Nov. 16, 2022, and the entire contents of the above applications are incorporated into this application by reference.

TECHNICAL FIELD

The application relates to the technical field of LED lamp, and relates to a switching device and LED candle light particularly.

BACKGROUND

With the improvement of people's living standards, in order to pursue a comfortable and elegant living space, candles have become more than a tool for lighting, people often use candles to change the indoor environment atmosphere, the soft candlelight of candles can make people feel happy and relaxed, traditional candle lights are generally composed of a lamp body and a wick, the lamp body made of paraffin material is burned when lighting the wick made of wire to achieve the lighting effect, the burning time and service life of each candle are limited, and the traditional candle will produce smoke after lighting, which not only pollutes the environment, but also is not conducive to people's health, it is necessary to relight a new candle when paraffin is burned out, it is easy to be blown out by wind or airflow during use, and it is also easy to ignite the surrounding combustibles leading to a fire, which is a great safety hazard for human beings and property safety.

Nowadays, electronic candle lights gradually replace traditional candles, which can simulate the lighting effect by using LED beads, with the development of LED lights, there are more and more types of LED candle lights, however, this type of LED candle bulb is large, and the battery is easy to have unstable contact with the LED light during use, the switch control operation is inconvenient, some of the internal parts of the LED light are easy to fall off, the battery cover is removable and is easy to be eaten by children, which threatens their safety.

SUMMARY

In view of the situation above, in order to overcome the defects of existing technology, this application provides a switching device and LED candle light, the application use the height difference formed by the end of gradually elevated arc groove and the bottom edge of limit slot to guide the extensions of the battery cover into the limit slot, so as to fix the connection between the battery cover and the battery compartment, and to solve the problem that children can unscrew the battery cover easily, with the locking groove, the battery cover compresses the battery to realize the electrical connection between the battery and the first pin of lamp bead through a hook assembly of the switch and the bending 90° first pin of the lamp bead to ensure an electrical contact stability.

According to the first aspect of the application, a switching device is proposed, comprising a battery compartment, a lamp bead and a switch, the battery compartment is provided with a hollow barrel-shaped assembly to accommodate a battery, and the lamp bead is provided on a lamp holder of the hollow barrel-shaped assembly, the switch is assembled beside the battery compartment through a hook&hole assembly, the lamp bead is electrically connected with the switch and the battery to control the on-off of the light circuit, the switch is installed on the battery compartment through several positioning columns formed on a base plate of the battery compartment, the hollow barrel-shaped assembly, the lamp bead and the switch are equipped on the battery compartment through positioning columns to achieve a compact layout of entire device.

In one embodiment, a battery compartment is provided with a hole assembly, the hole assembly is provided with a hook assembly for user operation, which is inserted in the hole assembly to form a hook&hole assembly with the hole assembly, the transition of switching positions of switch on the battery compartment can be realized by the hook&hole assembly.

In one embodiment, a sliding track is also provided above a hole assembly, a battery compartment is provided with two sliding plates near both ends of the sliding track, and a switch mounted within the hole assembly is provided on the sliding plates and reciprocated along the sliding track, the hole assembly accommodates the sliding track, which enables the switch to move back and forth in the sliding track, thereby controlling the on-off of the circuit, the sliding plates can cooperate with several positioning columns to fix the switch on the battery compartment.

In one embodiment, a switch is also provided with a convex, positioning columns comprise a first positioning column part near the hollow barrel-shaped assembly, and a second positioning column part away from the hollow barrel-shaped assembly, the second positioning column part comprises a gear guide column which cooperates with the convex to lag a switch, and the gear guide column is a semi-cylinder oriented toward the switch, when the switch is reciprocating in the sliding track, the convex of switch and the gear guide column stick and separate, and generate an on/off sound.

In one embodiment, a lamp bead comprises a first pin and a second pin, the first pin is bent 90°, the first pin passes through a through hole of a lamp holder and is inserted into a hollow barrel-shaped assembly, the bending 90° segment of the pin is electrically connected with the negative electrode of the battery, the through hole of lamp holder facilitates the electrical connection between the first pin and a battery.

In one embodiment, a switch is also provided with a switch connection hole, a second pin is used to insert the switch connection hole for detaching from or connecting to the positive electrode of the battery when the switch slips in a sliding track, so as to control the on-off of the light circuit, the switch connection hole is used to fit and connect the switch with the positive electrode of a lamp bead, when the switch slips in the sliding track of the battery compartment, the lamp bead is driven by the second pin to contact with or detach from the positive electrode of the battery, and then the on-off of the light circuit is completed, and the operation is convenient and quick.

According to the second aspect of this application, an LED candle lamp is proposed, comprising a switching device as described above, also comprising a battery cover and a housing mounted on the battery compartment, the hollow barrel-shaped assembly is provided with a cavity, the side wall of the cavity is provided with two locking grooves, the battery cover is provided with a pair of extensions cooperating with the locking grooves, the locking grooves comprise an arc groove and a limit slot, at least one edge of the arc groove elevates gradually in the direction away from the base plate of the battery compartment, there is a height difference between the end of the gradually elevated edge of arc groove and the bottom edge of the limit slot, the limit slot accommodates the insertion of the extensions to lock the battery cover, a lamp bead, and a switch, and a battery compartment, and a battery and the battery cover are all set in the housing, the height difference formed by the end of the arc groove and the bottom edge of limit slot guides the extensions of battery cover into the limit slot, so as to realize the fixed connection between the battery cover and the battery compartment, which prevents children from easily unscrewing the battery cover, the assembly is simple, small, the parts are not easy to fall off, and the use is safer.

In one embodiment, two locking grooves also comprise a transition groove, the transition groove and an arc groove are arranged symmetrically on the side wall of a cavity, and the two sides of the transition groove extend parallel to each other, the arrangement ensures that an extension of the battery cover away from the arc groove is rotated into the transition groove when another extension of the battery cover close to the arc groove is also stuck into the limit slot.

In one embodiment, the locking grooves comprise a set of arc groove and limit slot joined with the arc groove, which are arranged symmetrically on the side wall of a cavity, the arrangement ensures that both extensions of the battery cover can be rotated into the end of the arc groove and easily inserted into the limit slot, leading to lock the extensions in the limit slot, so that the battery cover and a battery compartment are more closely connected and the battery cover is more difficult to unscrew.

In one embodiment, a battery compartment is symmetrically provided with two placing grooves joined with two locking grooves, and the housing grooves are used to guide two extensions into a limit slot in conjunction with an arc groove, with the arrangement of the placing grooves, the initial position of the extensions of the battery cover can be easily determined before they are screwed into the locking grooves, so that a battery cover is fixed with the locking grooves more quickly.

In one embodiment, at least one edge of an arc groove elevates at a fixed slope, which ensures a certain height difference between the end of the arc groove and a bottom of a limit slot, and two extensions of the battery cover generate a friction force when sliding on the arc groove, the arc groove elevated at a fixed slope will make friction force between the battery cover and the arc groove roughly unchanged during the locking process, thus, the extensions of the battery cover reach the end of the arc groove and snap into the limit slot more easily when sliding through the arc groove.

In one embodiment, at least one edge of an arc groove is an edge close to a base plate of a battery compartment, and the other side of arc groove away from the base plate of the battery compartment extends parallel to the base plate of the battery compartment, an edge of the arc groove close to the base plate of the battery compartment can facilitate two extensions of a battery cover to slide on the arc groove, and the other side of the arc groove away from the bottom of the battery compartment extends parallel to the base plate of the battery compartment, which facilitates the extensions of the battery cover to fall into the limit slot without occlusion after sliding to the end of the arc groove.

In one embodiment, a limit slot is in the same plane as the bottom of a transition groove, with the arrangement, two extensions of a battery cover are screwed into two locking grooves and may remain in the same plane after at least one extension is inserted into the limit slot, thus keeping the bottom of the battery cover and the base plate of the battery compartment in the same plane.

In one embodiment, the inner surface of a battery cover is provided with a pair of ring support edges for supporting a battery, and the outer surface of the battery cover is also provided with grooves, on the one hand, ring support edges ensure that the battery is on the support edge of the battery cover when in a cavity, so that the battery and a hollow barrel-shaped assembly are closely fit to make the battery and a first pin of a lamp bead electrically connected, on the other hand, it can ensure that the battery cover, and the battery, and a battery compartment are attached closely, so that the battery cover cannot be pushed upward, on the one hand, the groove of the outer surface of the battery cover can be used to screw the battery cover into two locking grooves, on the other hand, the connection between a housing and a base plate of a battery compartment, as well as the connection between two extensions of the battery cover and a limit slot, can be unlocked with the help of tools, which make it easy to unscrew the battery compartment and the battery cover for the replacement of the battery.

In one embodiment, a battery compartment is provided with a reinforcing ring and a housing is provided with a reinforcement groove in coordination with the reinforcing ring, the combination of the reinforcing ring and the reinforcement groove facilitates the assembly of the battery compartment and the housing, the reinforcing ring can enhance the crack resistance of the whole device, so as to safer use.

In one embodiment, a reinforcing ring is provided with a positioning gap and a housing is provided with a positioning convex for matching the positioning gap to connect the battery compartment with the housing, through the positioning gap of the reinforcing ring and the positioning convex, the housing can be fixed on the battery compartment, making the housing and the battery compartment locked or unlocked with tools easily, the design makes it difficult for children to pry open.

In one embodiment, a base plate of a battery compartment is provided with three support columns for supporting a housing and the battery compartment, the support columns are used to keep the entire device in a stationary state when placed in the plane.

In one embodiment, one end of a housing is provided with a lampshade for accommodating a lamp bead, the housing is provided above a lamp bead and a battery compartment, the housing comprises at least one structural feature, and is installed in the battery compartment while the lampshade is set on the outer perimeter of the lamp bead, because the housing is compact and simple, the lamp bead can maximize the transparent and clean lighting effect.

In one embodiment, a housing is provided as a Mobius housing or a wave housing or a cylindrical housing or a Roman pillar housing or a love-shaped housing, the use of different appearance characteristics of the lamp assembly, can show different lighting effects, so as to improve the lighting effect of LED candle lamp, and to reduce the volume of the assembly, and to avoid the problem that assembly volume is too large to cause installation, and to reduce use inconvenience and other problems.

Compared with existing technology, the benefits of this application are:

1. In this application, two extensions of a battery cover are locked in a limit slot by the height difference between the gradually elevated end of an arc groove and a bottom side of the limit slot, so as to realize the fixed connection between the battery cover and a battery compartment, and to prevent children from unwinding the battery cover easily, the device is simple in assembly, easy to install and safe to use.

2. In this application, a positioning gap of a reinforce ring and a convex of a housing, can fix a housing on a base plate, which makes it easy to lock or unlock the housing and base with tools, with the exquisite design, children are difficult to pry it open, the reinforce ring can strengthen the crack resistance of the whole device, so that it is safer to use.

3. In this application, a lamp assembly is composed by a housing, and a lamp bead, and a switch, and a battery compartment, and a battery and a battery cover, etc, the design is compact and simple, and is easy to achieve automation, based on excellent cost advantage, it is more competitive in the market.

4. In this application, a lamp bead and a switch which controls the on/off of the circuit by sliding are set in a battery compartment, a housing can be assembled in a lamp assembly to show different lighting effects with different appearance features, due to the compact and simple internal assembly design, the lamp realizes the transparent and clean lighting effect to the maximum extent.

5. In this application, a bending 90° first pin of a lamp bead is in contact with the negative electrode of a battery to complete an electrical connection, due to a combination of an arc slot and a limit slot, a battery cover can be pressed to match the battery with the first pin of the lamp bead, which ensures the stability of the electrical contact.

6. In this application, a hook&hole assembly is used to realize the on/off of a switch on a battery compartment, and a sliding track is used to make the switch move back and forth, so that when the switch slips in the sliding track of the battery compartment, it will drive a second pin of a lamp bead to contact with or detach from the positive electrode of a battery, and then complete the on-off of the lamp circuit, which is convenient and quick to operate, using the combination of a convex and gear guide columns can generate an on/off sound.

In this application, in order to save cost and improve the sensory visual design of users, the lamp bead installation and on/off control are combined with the housing of different lighting effects characteristics, which improves a luminous effect of a LED candle lamp, and reduces the structural volume, and avoids problems such as installation and inconvenience caused by excessive structural volume.

BRIEF DESCRIPTION OF THE DRAWINGS

Drawings are included to provide a further understanding of the embodiment and are incorporated into this specification, which becomes a part of this specification, the drawings illustrate the embodiment and are used in conjunction with the description to explain the principles of the present disclosure, many expected advantages of other embodiment will be understood easily by referring to the following detailed description, the elements in the attached drawings are not necessarily proportional, the same attached marks refer to the corresponding similar parts.

The meaning of each number in the figure.

Notes: 1—battery compartment, 11—hollow barrel-shaped assembly, 111—lamp holder, 112—through hole, 113—cavity, 12—positioning column, 121—first positioning column part, 122—second positioning column part, 1221—gear guide column, 13—hole assembly, 131—sliding track, 14—sliding plate, 15—locking groove, 151—arc groove, 152—limit slot, 153—transition groove, 16—housing groove, 17—reinforcing ring, 18—positioning gap, 19—support columns, 2—lamp bead, 21—first pin, 22—second pin, 3—switch, 31—convex, 32—hook assembly, 33—switch connection hole, 4—battery cover, 41—extension, 42—ring support edge, 43—groove, 5—battery, 6—housing, 61—positioning convex, 62—lampshade, 63—reinforcing groove.

DETAILED DESCRIPTION OF THE DISCLOSURE

In the following detailed description, the reference drawing form a part of a detailed description and is shown wherein an illustrative specific embodiment of the application can be practiced, the application use the term direction referring to the orientation of drawings described, such as “top”, “bottom”, “left”, “right”, “up”, “down”, etc, because the components of the embodiment may be positioned in several different orientations, orientation terms are used for illustrated purposes and are not limited, it should be understood that other embodiment may be utilized and logical changes may be made without departing from the scope of this application, the following detailed description should not be adopted in a restrictive sense, and the scope of this application is limited by the attached claims.

Figure 1:
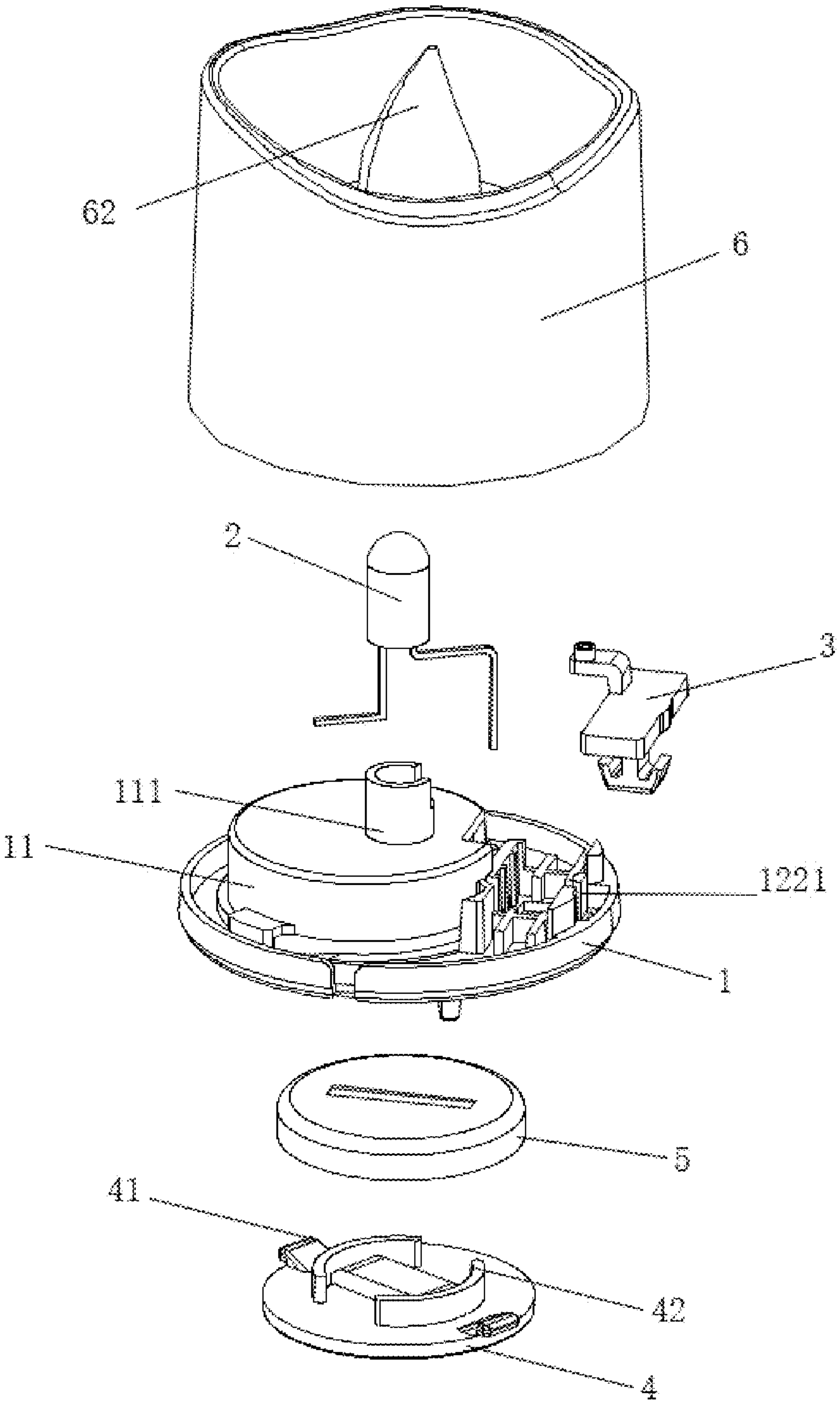
FIG. 1 is an explosion diagram of an LED candle lamp based on an embodiment of the application.
Figure 2:
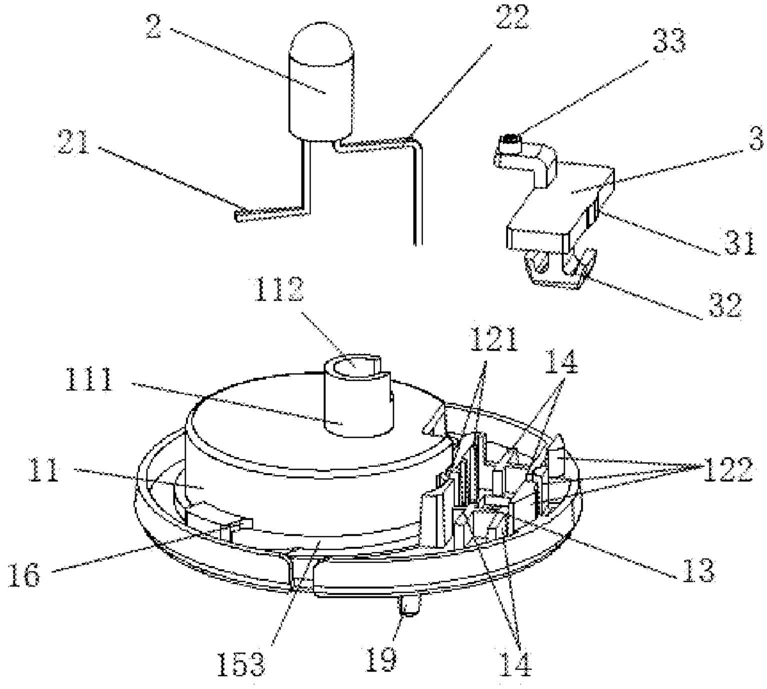
FIG. 2 is a local explosion diagram of a base, and a lamp bead, and a switch according to an embodiment of the application.

According to the first aspect of the application, a switching device is proposed referring to FIG. 1 and FIG. 2, comprising a battery compartment 1, and a lamp bead 2 and a switch 3, the battery compartment 1 is provided with a hollow barrel-shaped assembly 11 to accommodate a battery 5, and the lamp bead 2 is provided on a lamp holder 111 of the hollow barrel-shaped assembly 11, the switch 3 is provided on the battery compartment 1 through a hook&hole assembly, the lamp bead 2 is electrically connected with the battery 5 by the switch 3 to control the on/off of the light circuit, and the switch 3 is installed on the battery compartment 1 through positioning columns 12 set in battery compartment 1, the hollow barrel-shaped assembly 11, the lamp bead 2 and the switch 3 are clamped to the battery compartment 1 by positioning columns 12 to achieve a compact layout of entire device.

In the specific embodiment, the battery 1 compartment is provided with a hole assembly 13, the hole assembly 13 is provided with a hook assembly 32, the hook assembly 32 is inserted in the hole assembly 13 and is limited to form a hook&hole assembly with the hole assembly 13, the up and down range of switch 3 in the battery compartment is limited by the hook&hole assembly.

In the specific embodiment, a sliding track 131 is also provided with the hole assembly 13, the battery compartment 1 is provided with two sliding plates 14 close to both ends of the sliding track 131, and the switch 3 mounted within the hole assembly 13 is provided with the sliding plates 14 and reciprocated along the sliding track 131, the hole assembly 13 accommodates the sliding track 131, which enables the switch 3 to move back and forth, thereby controlling the on-off of the circuit, the sliding plates 14 cooperate with the positioning columns 12 to fix the switch 3 on the battery compartment 1.

In the specific embodiment, the switch 3 is also provided with a convex 31, the positioning columns 12 comprise a first positioning column part 121 close to the hollow barrel-shaped assembly 11 and a second positioning column part 122 away from the hollow barrel-shaped assembly 11, the second positioning column part 122 comprises a gear guide column 1221 which cooperates with the convex 31 to lag the switch 3, the gear guide column 1221 is a semi-cylinder oriented toward the convex 31, when the switch 3 is reciprocating in the sliding track, the convex 31 of the switch 3 and the gear guide column 1221 are sticking and separating to and fro, generating an on/off sound.

In the specific embodiment, the lamp bead 2 comprises a first pin 21 and a second pin 22, the bending 90° first pin 21 passes through a through hole 112 of the lamp holder 111 and is inserted into the hollow barrel-shaped assembly 11, the bending 90° segment of the pin 21 is electrically connected with the negative electrode of the battery 5, the through hole 112 of the lamp holder 111 facilitates the electrical connection between the first pin 21 and the battery 5, to be sure, the first pin 21 can be negative pin while the second pin 22 can be the positive.

In the specific embodiment, the switch 3 is also provided with a switch connection hole 33, the second pin 22 is used to be inserted into the switch connection hole 33 to detach from or contact with the positive electrode of the battery 5 when the switch 3 slips in the sliding track 131, so as to control the on/off of the light circuit, the switch connection hole 33 is used to link the connection and coordination between the switch 3 and the positive pin of the lamp bead 2, when the switch 3 slips in the sliding track 131 of the battery compartment 1, the second pin 22 is driven to contact with or detach from the positive electrode of the battery 5, and then the on/off of the light circuit is completed, the operation is convenient and quick.

According to the second aspect of this application, an LED candle lamp is proposed referring to FIG. 2-FIG. 5, comprising a switching device as described above, also comprising a battery cover 4 and a housing 6 mounted on a battery compartment 4, a hollow barrel-shaped assembly 11 is provided with a cavity 113, the side wall of the cavity 113 is provided with two locking grooves 15, the battery cover 4 is provided with a pair of extensions 41 cooperating with the locking grooves 15, the locking grooves 15 comprise an arc groove 151 and a limit slot 152 joined with the arc groove 151, at least one edge of the arc groove 151 gradually elevates in the direction away from a base plate of the battery compartment 1, and the height of the end of elevated edge varies from the bottom edge of the limit slot 152, the limit slot 152 accommodates the insertion of the extensions 41 to lock the battery cover 4, the lamp bead 2, and the switch 3, and the battery compartment 1, and the battery 5 and the battery cover 4 are all set in the housing 6, the height difference between the end of the arc groove 151 and the bottom edge of the limit slot 152 locks the extensions 41 of battery cover 4 in the limit slot 152 to realize the fixed connection between the battery cover 4 and the battery compartment 1, which prevents children from unscrewing the battery cover 4 easily, the assembly is simple, small, the parts are not easy to fall off, and the use is safer.

In the specific embodiment, the locking grooves 15 also include a transition groove 153, the transition groove 153 and the arc groove 151 are arranged on the side wall of the cavity 113 symmetrically, and the two sides of transition groove 153 extend parallel to each other, the arrangement ensures that the extensions 41 of the battery cover 4 away from the arc groove 151 is rotated into the transition groove 153 while the extensions 41 of the battery cover 4 close to the arc groove 151 is stuck into the limit slot 152.

In the specific embodiment, the locking grooves 15 include a set of arc grooves 151 and limit slots 152 joined with the arc grooves 151, they are arranged symmetrically on the side wall of the cavity 113, the arrangement ensures that both extensions 41 of the battery cover 4 can be easily inserted into the limit slot 152 after being rotated into the end of the arc groove 151, so as to lock the extensions 41 in the limit slot 152, thus, the battery cover 4 and the battery compartment 1 are more closely connected, the battery cover 4 is more difficult to unscrew.

In the specific embodiment, the battery compartment 1 is symmetrically provided with two housing grooves 16 for accommodating the extensions 41 and cooperating with the locking grooves 15, and the housing grooves 16 for matching the arc groove 151 lock the extensions 41 in the limit slot 152, with the arrangement of the housing grooves 16, the initial position of the extensions 41 of the battery cover 4 can be determined easily before being screwed into the locking grooves 15, so that the battery cover 4 is more quickly fixed in the locking grooves 15.

In the specific embodiment, at least one edge of the arc groove 151 elevates at a fixed slope, which ensures a certain height difference between the end of the arc groove 151 and the bottom of the limit slot 152, the extensions 41 of the battery cover 4 generate a friction force when sliding on the arc groove 151, the arc groove 151 elevated at the fixed slope will make the friction force between battery cover 4 and the arc groove 151 roughly unchanged during the locking process, thus, the extensions 41 of the battery cover 4 snaps into the limit slot 152 more easily after reaching the end of the arc groove 151 when it slides on the arc groove 151.

In the specific embodiment, at least one edge of the arc groove 151 is an edge close to the base plate of the battery compartment 1, and the other side of the edge of the arc groove 151 away from the base plate of the battery compartment 1 extends parallel to the base plate of the battery compartment 1, an edge of the arc groove 151 close to the base plate of the battery compartment 1 can facilitate the extensions 41 of the battery cover 4 to slide on the arc groove 151, and another edge of the arc groove 151 away from the base plate of the battery compartment 1 extends parallel to the base plate of the battery compartment 1, which is convenient for the extensions 41 to drop into the limit slot 152 directly without occlusion after sliding to the end of the arc groove 151.

In the specific embodiment, the limit slot 152 is in the same plane as the bottom of the transition groove 153, with the arrangement, two extensions 41 of the battery cover 4 remain in the same plane when being screwed into the locking grooves 15 and at least one extension 41 is inserted into the limit slot 152, thus keeping the bottom surface of the battery cover 4 and the base plate of the battery compartment 1 in the same plane.

In the specific embodiment, the inner surface of the battery cover 4 is provided with a pair of ring support edges 42 for supporting the battery 5, and the outer surface of the battery cover 4 is also provided with grooves 43, on the one hand, ring support edges 42 fix battery 5 in a cavity 113 while ensuring that battery 5 is placing on the support edge of the battery cover 4, so that the battery 5 and the hollow barrel-shaped assembly 11 are closely fit to make an electrical connection between battery 5 and a first pin 21, on the other hand, it can ensure that the battery cover 4, and the battery 5, and the battery compartment 1 are close together, so that the battery cover 4 cannot be pushed upward, the grooves 43 of the outer surface of the battery cover 4 can be used to screw the battery cover 4 into locking grooves 15, on the other hand, not only the connection between the housing 6 and the base plate, but the link between the limit slot 152 and the extensions 41 of battery cover 4 can be unlocked with the help of tools, the battery compartment 1 and the battery cover 4 can be easily unlocked to facilitate the replacement of the battery 5.

In the specific embodiment, the battery compartment 1 is provided with a reinforcing ring 17, a reinforcing groove 63 is provided in the housing 6 to fit with reinforcing ring 17, the cooperation between the reinforcing ring 17 and the reinforcing groove 63 facilitates the assembly of the battery compartment 1 and housing 6, the reinforcing ring 17 can enhance the crack resistance of the whole device, so as to safer use.

In the specific embodiment, the reinforcing ring 17 is provided with a positioning gap 18, the housing 6 is provided with a positioning convex 61 for cooperating with the positioning gap 18 to connect the battery compartment 1 with the housing 6, through the positioning gap 18 and the positioning convex 61, the housing 6 can be fixed on the battery compartment 1, making the housing 6 and the battery compartment 1 locked or unlocked with tools more easily, the design makes it difficult for children to pry open.

In the specific embodiment, the base plate of the battery compartment 1 is provided with three support columns 19 for supporting the housing 6 and the battery compartment 1, the support columns 19 are used to keep the entire device in a stationary state when placed in the plane.

In the specific embodiment, one end of the housing 6 is provided with a lampshade 62 for accommodating the lamp bead 2, and the housing 6 comprises at least one structural feature, the housing 6 is installed on the battery compartment 1 while the lampshade 62 is placed at the periphery of the lamp bead 2, because the internal design of housing 6 is compact and simple, the lamp bead 2 can maximize the transparent and clean lighting effect.

Referring to FIG. 6-FIG. 10, the housing 6 is provided as a Mobius housing 6 or a wave housing 6 or a cylindrical housing 6 or a Roman pillar housing 6 or a love-shaped housing 6, by using different appearance features, the housing 6 can show different lighting effects, so as to improve the lighting effect of LED candle lamp, and to reduce the volume of the assembly, and to avoid problems such as installation and use inconvenience caused by excessive volume of the assembly.

Based on different locking grooves 15, embodiment is provided below:

Embodiment 1

Figure 3:
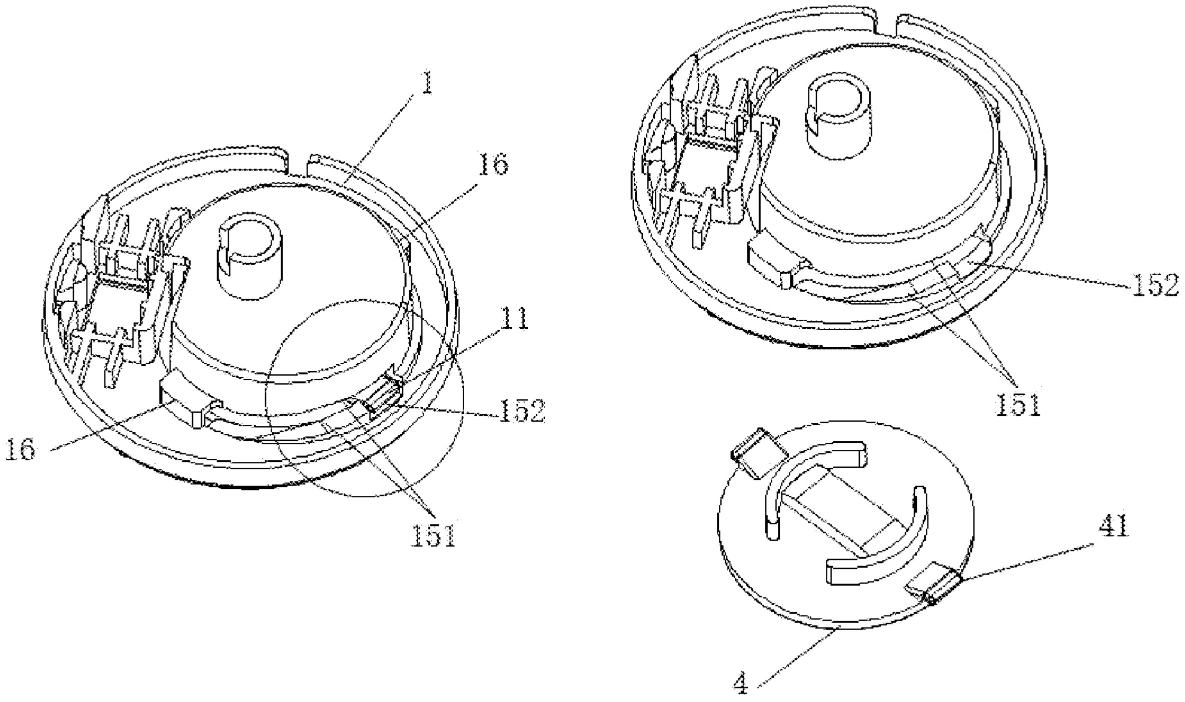
FIG. 3 is a structural diagram of a base and a battery cover before and after assembly according to a specific embodiment of the application.
Figure 4:
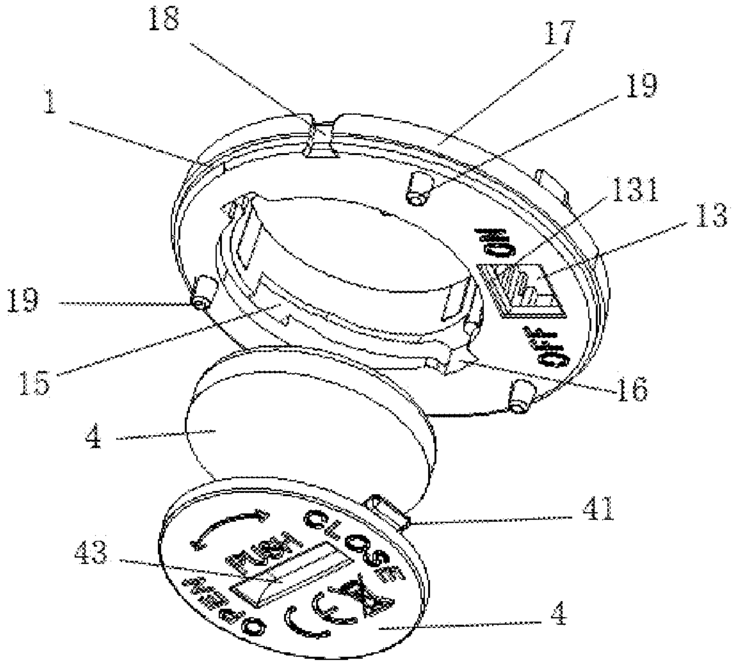
FIG. 4 is a local explosion diagram of an LED candle lamp according to one embodiment of the application.
Figure 5:
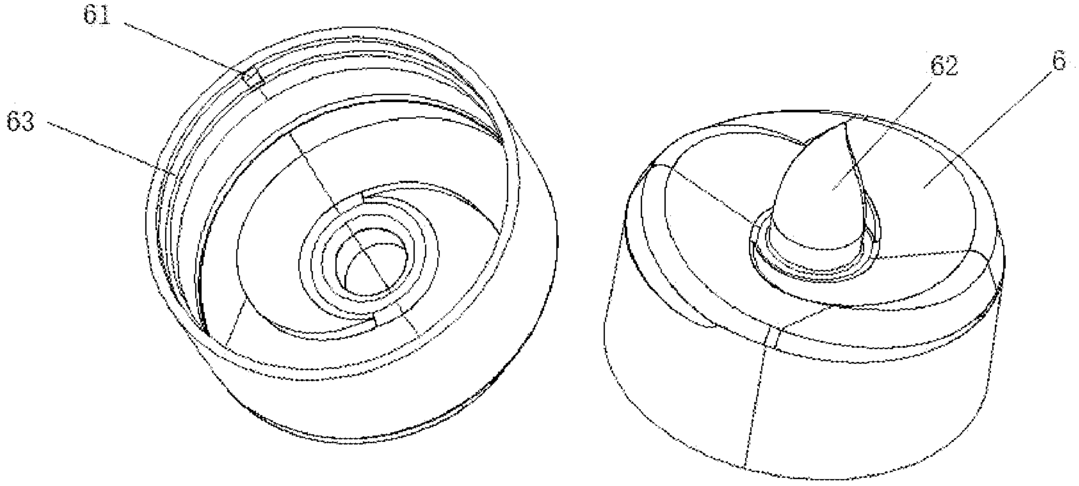
FIG. 5 is a local diagram of the assembly of a housing according to an embodiment of the application.
Figure 6:
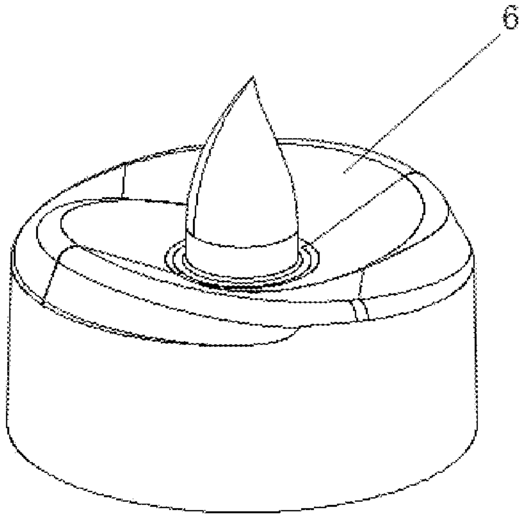
FIG. 6 shows the assembly diagram when the housing in FIG. 1 is a Mobius housing.
Figure 7:
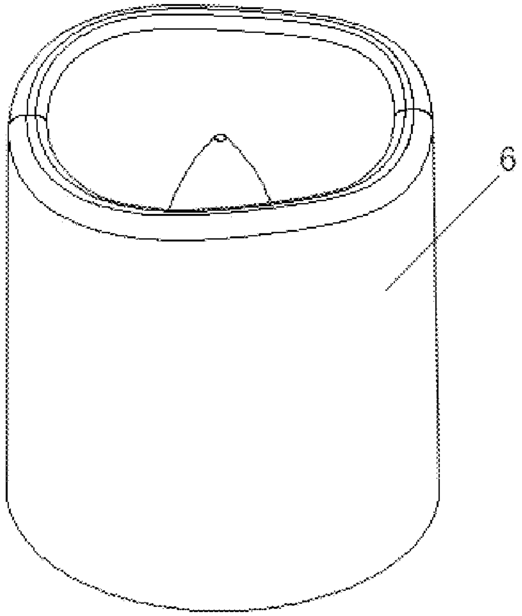
FIG. 7 shows the assembly diagram when the housing in FIG. 1 is a wave housing.
Figure 8:
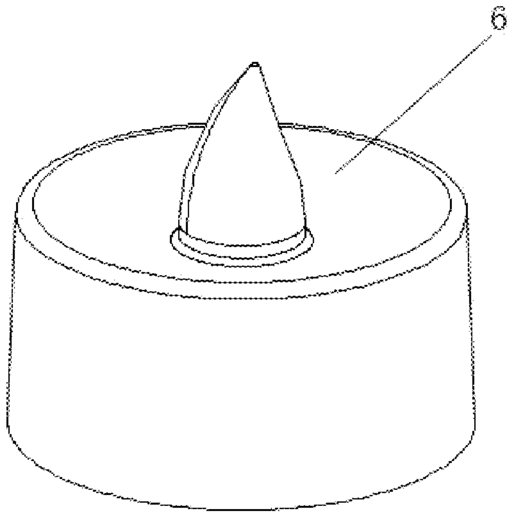
FIG. 8 shows the assembly diagram when the housing in FIG. 1 is a cylindrical housing.
Figure 9:
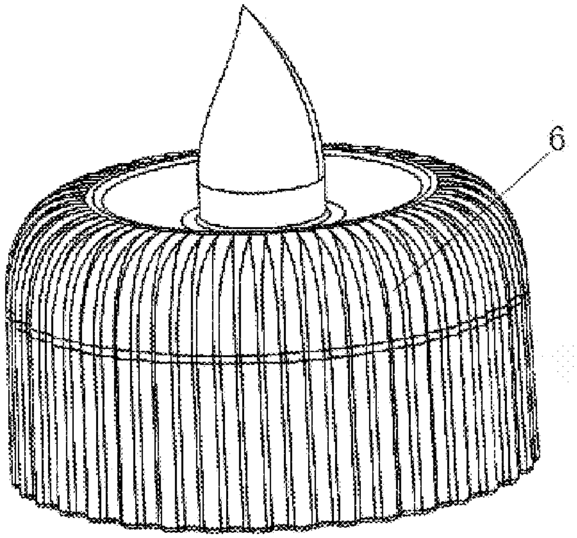
FIG. 9 shows the assembly diagram when the housing in FIG. 1 is a Roman column housing.
Figure 10:
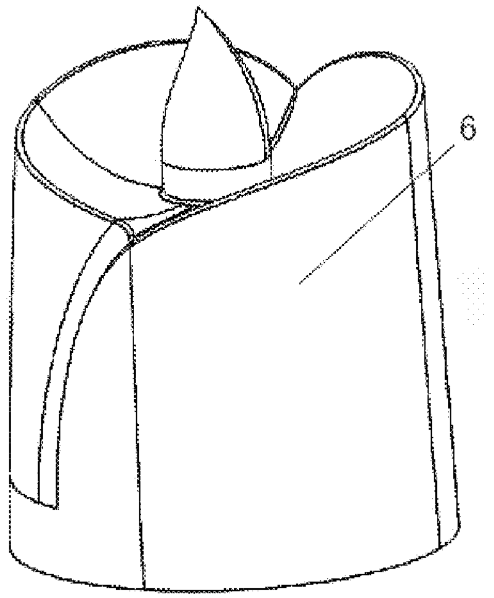
FIG. 10 shows the assembly diagram when the housing in FIG. 1 is a love-shaped housing.

Referring to FIG. 1-FIG. 3, the LED candle lamp comprises a battery cover 4, a battery compartment 1 and a housing 6 mounted on the battery compartment 1, the battery compartment 1 is provided with a cavity 113 equipped with a battery 5, the side wall of the cavity 113 is provided with two locking grooves 15, the battery cover 4 is provided with a pair of extensions 14 cooperating with the locking grooves 15, the locking grooves 15 comprises an arc groove 151 and a limit slot 152 joined with the arc groove 151, one edge of the arc groove 151 elevates gradually in the direction away from the base plate of the battery compartment 1, and there is a height difference between the end of the elevated edge and the bottom edge of the limit slot 152, the limit slot 152 accommodates the insertion of the extensions 41 to lock the battery cover 4, the LED candle lamp also comprises a lamp bead 2, and a switch 3, and a battery cover 4, and a battery compartment 1, and other related accessory assembly as stated above, the height difference between the gradually elevated end of the arc groove 151 and the bottom edge of the limit slot 152 locks the extensions 41 of the battery cover 4 in the limit slot 152 to realize the fixed connection between the battery cover 4 and the battery compartment 1, the assembly is simple and small, the parts are not easy to fall off, the use is safer.

In the specific embodiment, the locking grooves 15 also comprise a transition groove 153, the transition groove 153 and the arc groove 151 are arranged symmetrically on the side wall of the cavity 113, and the two sides of the transition groove 153 extend parallel to each other, the arrangement of the transition groove 153 ensures that the extension 41 of the battery cover 4 away from the arc groove 151 are rotated into the limit slot 153 when the extension 41 of the battery cover 4 close to the arc groove 151 are also stuck into the transition groove 152.

In the specific embodiment, one edge of the arc groove 151 elevated at a fixed slope, which ensures a certain height difference between the end of the arc groove 151 and the bottom of the limit groove 152, and the extensions 41 of the battery cover 4 generate a friction force when sliding on the arc groove 151, the arc groove 151 elevated at a fixed slope will make the friction force roughly unchanged during the locking process, thus, the extensions 41 of the battery cover 4 reach the end of the arc groove 151 and slip into the limit slot 152 more easily when sliding through the arc groove 151.

In the specific embodiment, one edge of the arc groove 151 is an edge close to the base plate of the battery compartment 1, and the other side of the edge of the arc groove 151 away from the base plate of the battery compartment 1 extends parallel to the base plate of the battery compartment 1, the edge of the arc groove 151 close to the base plate of the battery compartment 1 can facilitate the extensions 41 to slide on the arc groove 151, and the other side of the arc groove 151 away from the base plate of the battery compartment 1 extends parallel to the base plate of the battery compartment 1, so that the extensions 41 of battery cover 4 can slide to the end of the arc groove 151 directly and drop into the limit slot 152 without occlusion.

In other embodiment, one edge of an arc groove 151 is an edge away from the bottom of the battery compartment 1 and the front end of that is parallel to the other side of the bottom of the arc groove 151, the end of the side away from the base plate of the battery compartment 1 continues to elevate and extend along the front end, of course, the height difference between the end of the side of the arc groove 151 and the highest point of the bottom end of the other can be set according to specific needs, as long as that the top edge is in contact with two extensions 41 of a battery cover 4 and does not avoid the extensions 41 of the battery cover 4 falling into a limit slot 152 when the extensions 41 of the battery cover 4 snap into the limit slot 152.

In the specific embodiment, the limit slot 152 is in the same plane as the bottom of the transition groove 153, with the arrangement, two extensions 41 of the battery cover 4 remain in the same plane after being screwed into locking grooves 15 and one extension 41 is inserted into the limit slot 152, thus keeping the bottom surface of the battery cover 4 and the base plate of the battery compartment 1 in the same plane.

In the specific embodiment, the front lowest side of the arc groove 151 and the rear of the transition groove 153 are provided with two housing grooves 16 joined with the locking grooves 15, and the housing grooves 16 for cooperating with the locking grooves 15 lock the extensions 41 of the battery cover 4 in the limit slot 152, the size of the housing grooves 16 can match the extensions 41 of the battery cover 4, the depth of the housing grooves is greater than the thickness of the extensions 41 of the battery cover 4, the design make the initial position of the extensions 41 of the battery cover 4 can be easily determined before the extensions 41 of the battery cover 4 screwed into the locking grooves 15, so that the battery cover 4 is fixed in the locking grooves 15 more quickly.

Embodiment 2

Referring to FIG. 1-FIG. 3, this LED candle lamp, comprises a lamp bead 2 and a switch 3 described above, and also comprises a battery cover 4, and a battery compartment 1, and a housing 6 mounted on a battery compartment 1, the battery compartment 1 is provided with a cavity 113 equipped with a battery 5, the side wall of the cavity 113 is provided with two locking grooves 15, the battery cover 4 is provided with a pair of extensions 41 which are matched with the locking grooves 15, the locking grooves 15 comprise an arc groove 151 and a limit slot 152 joined with the arc groove 151, the edge of the arc groove 151 elevates gradually in the direction away from the base plate of the battery compartment 1, and there is a height difference between the end of the elevated edge and the bottom edge of the limit slot 152, the height difference matches the thickness of the extensions 41 of the battery cover 4, after the extensions 41 slide into the end of the arc groove 151, the gravity locks the extensions 41 of the battery cover 4 in the limit slot 152 to realize the fixed connection between the battery cover 4 and the battery compartment 1.

In the specific embodiment, the locking grooves 15 include a sets of arc grooves 151 and limit slots 152 joined with the arc grooves 151, which are arranged symmetrically on the side wall of the cavity 113, the arrangement ensures that the two extensions 41 of the battery cover 4 can be easily stuck into the limit slot 152 after being rotated into the arc groove 151, the arrangement locks the extensions 41 in the limit slot 152, so as to make the connection of the battery cover 4 and battery compartment 1 closer and to make it hard to unscrew the battery cover 4.

In the specific embodiment, the edge of the arc groove 151 elevates at a fixed slope, which ensures a certain height difference between the end of the arc groove 151 and the bottom of the limit slot 152, the extensions 41 of the battery cover 4 generate a friction force when sliding on the arc groove 151, the arc groove 151 elevated at a fixed slope will make the friction force between battery cover 4 and the arc groove 151 roughly unchanged during the locking process, thus, the extensions 41 of the battery cover 4 reach the end of the arc groove 151 and slip into the limit slot 152 more easily when sliding through the arc groove 151.

In the specific embodiment, one edge of the arc groove 151 is an edge close to the base plate of the battery compartment 1, and the top side of the arc groove 151 is away from the base plate of the battery compartment 1, the front of top side of the arc groove 151 extends parallel to the bottom edge of the arc groove 151, the end of the top side of the arc groove 151 extends parallel to the base plate of the battery compartment 1, the bottom edge of the arc groove 151 can facilitate the extensions 41 of the battery cover 4 to slide on the arc groove 151, and the top edge of the arc groove 151 away from the base plate of the battery compartment 1 makes the extensions 41 of the battery cover 4 slide to the end of the arc groove 151 and drop into the limit slot 152 directly, so that the extensions 41 of the battery cover 4 can be stuck in the limit slot 152 without occlusion.

In other embodiment, the top side of edge of a arc groove 151 is an edge away from the base plate of a battery compartment 1, the front end of the top side of the arc groove 151 is parallel to the bottom edge of the arc groove 151, the end of the top side of the arc groove 151 continues to elevate and to extend along the front end of the top side, of course, the height difference between the end of the top side of the arc groove 151 and the highest point of the bottom edge of the arc groove 151 can be set according to specific needs, as long as that the top edge is in contact with the extensions 41 of the battery cover 4 and does not avoid the extensions 41 of the battery cover 4 falling into the limit slot 152 when the extensions 41 of the battery cover 4 are stuck in the limit slot 152.

In the specific embodiment, the bottom of two limit slots 152 are arranged symmetrically in the same plane, with the arrangement, two extensions 41 of a battery cover 4 remain in the same plane after being screwed into limit slots 152, thus keeping the bottom surface of the battery cover 4 and a base plate of a battery compartment 1 in the same plane.

In the specific embodiment, the battery compartment 1 provides two housing grooves 16 symmetrically joined with the locking grooves 15, and the housing grooves 16 for cooperating with the locking grooves 15 guide the extensions 41 of the battery cover 4 into the limit slot 152, the size of the housing grooves 16 can match the extensions 41 of the battery cover 4, the depth of the housing grooves is greater than the thickness of the extensions 41 of the battery cover 4, the design makes the initial position of the extensions 41 of the battery cover 4 can be easily determined before the extensions 41 of the battery cover 4 are screwed in the locking grooves 15, so that the battery cover 4 is fixed in the locking grooves 15 more quickly.

The application relates to LED candle light, it's operating principles are described below:

The LED candle light for application comprises a battery cover 4, and a battery compartment 1, and a housing 6 mounted on a battery compartment 1, the battery compartment 1 has a cavity 113 with a battery 5 inserted, the side wall of the cavity 113 is provided with two locking grooves 15, the battery cover 4 is provided with a pair of extensions 41 cooperating with the locking grooves 15, the locking grooves 15 comprise an arc groove 151 and a limit slot 152, at least one edge of the arc groove 151 gradually elevates in the direction away from the base plate of the battery compartment 1, and the height of the end of the elevated edge varies from the bottom edge of the limit slot 152, there is a height difference between the end of the edge gradually elevated and the bottom edge of the limit slot 152, the height difference matches the thickness of the extensions 41 of the battery cover 4, after the extensions 41 slide into the end of the arc groove 151, the gravity locks the extensions 41 of the battery cover 4 in the limit slot 152 to realize a fixed connection between the battery cover 4 and the battery compartment 1, the edge of the battery compartment 1 is provided with a reinforcing ring 17, the reinforcing ring 17 is provided with a positioning gap 18 and the housing 6 is provided with a positioning convex 61 cooperating with the positioning gap 18 to connect the battery compartment 1 with the housing 6, the inner part of the housing 6 is also provided with a reinforcing groove 63 fit with a reinforcing ring 17 around the positioning convex 61, through the coordination between the positioning gap 18 and the positioning convex 61 as well as the combination of the reinforcing ring 17 and the reinforcing groove 63, the housing 6 can be fixed on the battery compartment 1, battery compartment 1 is provided with a hole assembly 13, and a sliding track 131 is also provided above the hole assembly 13, which enables the switch 3 to move back and forth in sliding track 131, by using hook assembly 32, the switch 3 is inserted into the sliding track 131, the switch 3 is provided with a switch connection hole 33, the positive pin of the lamp bead 2 is inserted into the switch connection hole 33 of the switch 3, and contact with or detach from the positive electrode of the battery 5 to facilitate an electrical connection while the switch is sliding in the sliding track 131, the negative pin of the lamp bead 2 is bent 90° and electrically connected with the negative electrode of the battery 5 through a through hole 112 of the hollow barrel-shaped assembly 11.

In the following detailed description, unless otherwise stated, the terms, such as "install", "link", "connect", "fix", etc, should be understood in a broad sense, for example, it can be described as permanent connection as well as detachable connection, it can connect in a mechanical way or a electrical way, it can be a direct contact or an indirect contact through an intermediate medium, it can be the internal connectivity between two elements or an interactive relationship of two elements, for the technicians in the art, they can understand those terms referred in this application in a concrete way based on specific embodiment.

In the description of this specification, unless otherwise stated, the first feature which is "above" or "below" the second feature can be a direct contact between the first and second feature, or an indirect contact between the first and second feature through an intermediate medium, moreover, the description that the first feature is "on", "over" and "above" the second feature, means that the first feature is directly above or diagonally above the second feature or simply indicates that the first feature is higher than the second feature in level, the description that the first feature is "below", "under", and "beneath" the second feature, can mean that the first feature is directly below or diagonally below the second feature or simply mean that the first feature is lower than the second feature in level, in addition, the terms "first" and "second" are used to describe purposes only and are not to be understood as indicating or implying relative importance, or as implicitly indicating the quantity of technical features, thus, a feature defined as "first" or "second" can explicitly or implicitly comprise one of the features at least.

In the description of this application, the reference terms, such as "an embodiment", "some embodiment", "examples", "specific embodiment", or "some examples", etc., are used to refer to the specific features, assembly, materials or features incorporated in at least one embodiment or example of this application, in this application, schematic representations of the above terms must not be directed to identical embodiment or examples, furthermore, the specific features, assembly, materials or features described may be combined in a suitable way in any one or more embodiment or examples, in addition, without contradicting each other, technicians in the art may combine the different embodiment or examples described in this application by the characteristics of different embodiment or examples.

Obviously, technicians in the art can make various modifications and changes to embodiment of this application without deviating from the spirit and scope of this application, in this way, this application is also intended to cover such modifications and changes if they fall within the claims of this application and its equivalents, the word "including" and "comprising" do not exclude the existence of other elements or steps not listed in the claims, the simple fact that certain measures are recorded in different dependent claims does not indicate that a combination of these measures cannot be used for profit, any pictorial marks in the claims shall not be considered to limit the scope.

The invention claimed is:

1. A switching device, comprising a battery compartment, a lamp bead and a switch, wherein the battery compartment is provided with a hollow barrel-shaped assembly for accommodating a battery, and the lamp bead is provided on a lamp holder of the hollow barrel-shaped assembly, the switch is provided with a hook, a hole is provided on a base plate of the battery compartment and the hook is used for user to operate, the lamp bead is electrically connected with the battery through the switch to control the on/off of light circuit, and the switch is assembled beside the battery compartment through several positioning columns formed on the base plate of the battery compartment, the hook extends from the positioning columns through the hole so as to be exposed;

wherein the battery compartment comprises a battery cover and a housing, the side wall of the housing is provided with two locking grooves, the battery cover is provided with a pair of extensions for cooperating with the locking grooves, at least one of the locking grooves comprises an arc groove and a limit slot joined with the arc groove, and at least one edge of the arc groove gradually elevates in the direction away from the base plate of the battery compartment, there is a height difference between the end of the gradually elevated edge and the bottom edge of the limit slot so as to lock the battery cover.

2. The switching device according to claim 1, wherein the positioning columns form a sliding track, the switch is provided with two sliding plates for sliding along the sliding track.

3. The switching device according to claim 1, wherein the sliding plates are provided with a convex, the positioning columns comprise a guide column standing in a sliding way of the convex, so as to cooperate with the convex to distinguish two switching positions of the switch.

4. The switching device according to claim 1, wherein the lamp bead comprises a first pin and a second pin, the first pin passes through a through-hole of the lamp holder and is inserted into the hollow barrel-shaped assembly, so as to be connected with an electrode of the battery.

5. The switching device according to claim 4, wherein the second pin is attached to the switch so as to connect to or detach from another electrode of the battery when the switch is switched, so as to control the on-off of the light circuit.

6. A LED candle light, comprising a switching device according to claim 1.

7. The switching device according to claim 1, wherein another of the locking grooves comprises a transition groove, and two sides of the transition groove are extending parallel to each other.

8. The switching device according to claim 1, wherein the locking grooves respectively comprise a set of the arc groove and the limit slot.

9. The switching device according to claim 1, wherein the battery compartment is provided with two placing grooves joined with the locking grooves respectively, the placing grooves are used to guide the extensions into the locking grooves.

10. The switching device according to claim 1, wherein the at least one edge of the arc groove elevates at a fixed slope.

11. The switching device according to claim 1, wherein the at least one edge of the arc groove is close to the base plate of the battery compartment comparted with the other edge of the arc groove.

* * * * *